Patented July 4, 1939

2,164,356

UNITED STATES PATENT OFFICE 2,164,356

ESTERS OF 1,4-DIOXANEDIOL-2,3

Harold R. Slagh, Midland, Mich., assignor to The Dow Chemical Company, Midland, Mich., a corporation of Michigan No Drawing. Application August 28, 1937, Serial No. 161,470

7 Claims. (Cl. 260—338)

This invention concerns esters of 1,4-dioxanediol-2,3 having the formula

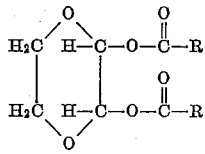

wherein each R represents an unsaturated organic radical.

I have prepared members of this class of compounds, determined certain physical characteristics thereof, whereby they may be readily identified, and found that they are particularly useful as plasticizers, insecticidal agents, intermediates, etc.

These new compounds may be prepared by reacting 2,3-dichloro-dioxane-1,4 with a mono-carboxylic acid containing an unsaturated organic residue, e. g. cinnamic acid, furoic acid, methyl acrylic acid, etc. While the carboxylic acid and dichloro-dioxane can be reacted together in varying proportions, I generally employ from about 0.5 to about 2.25 molecular equivalents of acid for each mol of dichloro-dioxane. A mixture of di-esters of 1,4-dioxanediol-2,3 and mono-esters of 1,4-dioxaneol-2-chloro-3 is generally formed, the di-ester being formed in increasing proportion as the ratio of acid to dichloro-dioxane in the reaction mixture increases. In carrying out the reaction, the acid and dichloro-dioxane are mixed together and warmed to a temperature at which hydrogen chloride is evolved from the mixture. Following completion of the reaction, the crude reaction mixture is treated to recover the ester products.

The preferred reaction temperature varies with the particular acid employed but is generally between about 100° C. and the decomposition temperature of the reaction mixture, although somewhat lower temperatures may be employed. While not essential, it is preferable that the reactants be dissolved in an inert solvent such as benzene, chloro-benzene, toluene, xylene, etc., and the reaction carried out by heating the mixture at its refluxing temperature. The time required for carrying out the reaction is dependent upon the reaction temperature employed and the particular acid present in the reaction mixture.

The products obtained in the above reaction vary widely in characteristics from stable, crystalline substances of definite melting point to unstable, viscous liquids, some of which decompose upon distillation and have the characteristic of rapid polymerization upon exposure to air and light. The methods by which such ester products are isolated from the crude reaction mixture vary with the particular compounds concerned. For example, in isolating the ester derivatives of low boiling and stable acids, the crude reaction product may be fractionally distilled under reduced pressure. Where high boiling or unstable acids are employed in the reaction, the crude mixture resulting therefrom may be partially distilled under reduced pressure to recover low boiling products of reaction and unreacted acid and dichloro-dioxane, and subsequently fractionally crystallized, clarified with activated carbon, or selectively extracted with solvents adapted to effect separation of the desired ester derivatives. When the ester product formed is insoluble, a preliminary separation may be accomplished by filtration of the reaction mixture.

The following examples describe the preparation of certain representative members of this class of compounds but are not to be construed as limiting the invention.

Example 1

79 grams (0.5 mole) of 2,3-dichloro-dioxane-1,4, 282 grams (1 mole) of oleic acid, and 50 milliliters of xylene were heated together at the refluxing temperature of the mixture for 14 hours at temperatures gradually increasing from 161° to 190° C. The reaction mixture was cooled, and xylene and residual reactants were removed by distillation under reduced pressure up to a temperature of 205° C. at 0.1 inch pressure. The residue consisted of 288 grams of a di-oleate of 1,4-dioxanediol-2,3 product as a dark, syrupy liquid having a specific gravity of 0.904 at 20°/4° C. This product decomposed on attempted distillation under reduced pressure.

Example 2

A mixture of 148 grams (1 mole) of cinnamic acid, 79 grams (0.5 mole) of 2,3-dichloro-dioxane-1,4, and 100 milliliters of toluene was refluxed at 128° C. for 16 hours. The reaction product was cooled, and the toluene, low boiling reaction products, and residual reactants recovered by distillation under vacuum. 199 grams of a di-cinnamate product was obtained as a solid residue. This product was broken up, extracted with ether, filtered, and washed, yielding 121 grams of white crystals melting at 192° C. Upon recrystallization from benzene there was obtained white, fluffy crystals of the di-cinnamate of 1,4-dioxanediol-2,3 melting at 193° C. This compound is substantially odorless and relatively insoluble in most common organic solvents.

Example 3

86 grams (1 mole) of beta-methylacrylic acid, 79 grams (0.5 mole) of 2,3-dichloro-dioxane-1,4, and 100 milliliters of xylene were mixed together and refluxed at temperatures gradually increasing from 140° to 150° C. for 14 hours. The xylene was thereafter distilled from the reacted product under reduced pressure, whereby the desired ester product was obtained as a viscous insoluble residue. This product, on boiling with ethyl alcohol, became gelatinous. The ethyl alcohol dispersion was cooled and filtered to obtain a residue of a di-(methylacrylate) of 1,4-dioxanediol-2,3 product as a spongy, brittle, resinous material substantially insoluble in most common organic solvents, and having a pleasant fruity odor.

Example 4

112 grams (1 mole) of furoic acid, 79 grams (0.5 mole) of 2,3-dichloro-dioxane-1,4, and 100 milliliters of xylene were mixed together and refluxed at a temperature of 140°–144° C. for 13 hours. Fractional distillation of the reacted mixture resulted in the recovery of the xylene and unreacted portions of the furoic acid and dichloro-dioxane, and in the isolation of 59 grams of the di-furoate of 1,4-dioxanediol-2,3 boiling at 174°–183° C. at 0.25 inch pressure. Upon recrystallization from ethyl alcohol this latter fraction yielded white crystals melting at 73° C. and having a pleasant ester odor.

Example 5

79 grams (0.5 mole) of 2,3-dichloro-dioxane-1,4, 190 grams (1 mole) of coumarin-carboxylic acid having the formula

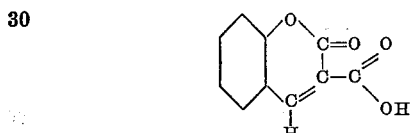

and 100 milliliters of xylene were refluxed together at 146°–154° C. for 11.5 hours. The reaction product was then cooled, filtered to remove xylene and residual reactants, and washed with xylene and ether. The residue, consisting of 147 grams of crude di-ester product, was very insoluble in most organic solvents and melted at 239°–243° C. A small amount of this product was recrystallized from epichlorohydrin to obtain the di-(coumarin-carboxylate) of 1,4-dioxanediol-2,3 as fine, tan colored crystals having a sweetish ester odor, and melting at 255° C.

Example 6

In a similar manner 2,3-dichloro-dioxane-1,4 was reacted with crotonic acid and the crude product fractionally distilled under reduced pressure, whereby there was obtained a di-crotonate of 1,4-dioxanediol-2,3 fraction as a semi-solid composition boiling at 169° C. at 0.1 inch pressure. This product is relatively insoluble in most common organic solvents, and upon recrystallization melts at 61° C.

Other acids which may be reacted with 2,3-dichloro-dioxane-1,4 in a manner analogous with that described in the foregoing examples include the following: alpha-bromo-cinnamic acid, para-nitro-cinnamic acid, nitro-pyromucic acid, alpha-chloro-crotonic acid, beta-bromo-crotonic acid, atropic acid, 2,4-dichloro-phenyl-acrylic acid, etc. Mixtures of the above and similar mono-carboxylic acids may be reacted with 2,3-dichloro-dioxane-1,4 to obtain di-ester products in which the esterifying groups are not identical. Similarly, mono-esters of 1,4-dioxaneol-2-chloro-3 can be reacted with the unsaturated carboxylic acids to give mixed di-esters of dioxanediol. If desired, the crude products obtained in the above examples may be employed for various purposes without isolating individual ester compounds therefrom. The term "alkylene" as employed in the following claims refers to organic radicals derived from unsaturated ethylene type hydrocarbons, and having the general formula $C_nH_{2n}$. The term "benzenoid aryl radical" refers to phenyl type radicals and homologues and analogues thereof.

Other modes of applying the principle of my invention may be employed instead of those explained, change being made as regards the materials employed, provided the products described in the following claims be thereby obtained.

I therefore particularly point out and distinctly claim as my invention:

1. Di-esters of 1,4-dioxanediol-2,3 having the formula

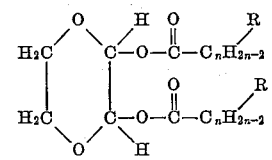

wherein $n$ represents an integer greater than 1 and each R represents a member of the class consisting of hydrogen and the benzenoid aryl radicals.

2. Di-esters of 1,4-dioxanediol-2,3 having the formula

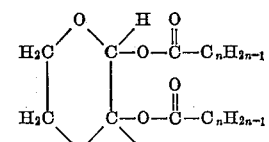

wherein $n$ represents an integer greater than 1.

3. Di-esters of 1,4-dioxanediol-2,3 having the formula

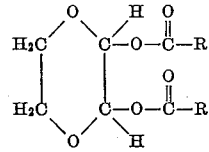

wherein each R represents an alkylene radical.

4. Di-esters of 1,4-dioxanediol-2,3 having the formula

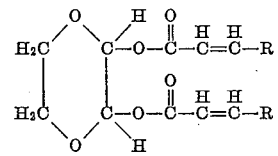

wherein each R represents a benzenoid aryl radical.

5. Di-esters of 1,4-dioxanediol-2,3 having the formula

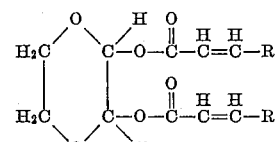

wherein each R represents a member of the group consisting of alkyl and aryl hydrocarbon radicals.

6. The di-cinnamate of 1,4-dioxanediol-2,3.
7. The di-crotonate of 1,4-dioxanediol-2,3.

HAROLD R. SLAGH.